3,642,901
BORON TRIFLUORIDE ETHERATE-AMINE REACTION PRODUCTS
Abraham M. Herbsman, 9721 3rd Ave.,
Los Angeles, Calif. 90305
No Drawing. Application Sept. 13, 1968, Ser. No. 759,780, now Patent No. 3,488,169, dated Jan. 6, 1970, which is a continuation-in-part of application Ser. No. 283,550, May 27, 1963. Divided and this application July 31, 1969, Ser. No. 864,241
Int. Cl. C07c 35/00, 87/00, 87/06
U.S. Cl. 260—583 A                     4 Claims

ABSTRACT OF THE DISCLOSURE

A composition of matter, which is soluble in gasoline and in liquid aliphatic hydrocarbons, and which consists of the product, produced by reacting boron trifluoride ethyl ether complex with an amine reagent, selected from the group consisting of tertiary nonyl amine, a mixture of tertiary-alkyl primary amines, ranging from t-$C_{12}H_{25}NH_2$ to t-$C_{15}H_{31}NH_2$, a mixture of tertiary-alkyl primary amines, ranging from t-$C_{18}H_{37}NH_2$ to t-$C_{24}H_{49}NH_2$, and primary alkyl aryl amines in which the alkyl radical is large enough to impart solubility to the reaction product in gasoline and liquid aliphatic hydrocarbons.

---

This application is a division of my prior copending application Ser. No. 759,780, filed Sept. 13, 1968, and now U.S. Pat. 3,488,169, which is in turn a continuation-in-part of my prior application Ser. No. 283,550, filed May 27, 1963, and now abandoned.

The present invention relates to new compositions of matter and method for treating internal combustion engine fuel gases, which consists in employing with the fuel or the gases formed on combustion of the fuel a catalytic agent, capable of promoting polymerization and chemical condensation of organic compounds, such as unsaturated hydrocarbons, olefins and aldehydes. This treatment has been found to inactivate and lessen the smog-inducing components of the engine exhausts to a material degree, principally by decreasing the nitrogen oxides content and increasing the molecular structure of the olefinic and unsaturated hydrocarbons of the combustion gases. It also has been found to inclusively improve combustion, effect smoother engine performance and give better mileage, when the catalytic agent, as a catalytic composition, is added to automobile fuel.

According to certain aspects of my invention, the combustion engine gases are subjected to continuous intimate gaseous admixture with the catalyst in a practically nascent vapor state. Thus, the most efficient means of catalytic application is attained. Also of note, is the fact that the catalytic effect, herein employed, does not require the injection of supplemental or secondary air into the exhaust, as demanded with the use of "afterburners" and oxidation catalysts; and accordingly obviates the pollution that results from the additional oxides of nitrogen, produced by such introduction of air.

The untreated engine exhaust gases contain unsaturated hydrocarbons, including olefins, which, accompanied by oxides of nitrogen in the exhaust, readily react in the atmosphere in the presence of sunlight to produce smog and irritating conditions. Also, expelled in the exhaust are aldehydic, ketonic and organic acid type compounds ("Nature of Smog" by W. L. Faith in Chemical Engineering Progress, 53, 406, August 1957). One of the most smog-afflicted areas is Los Angeles, California. As stated in Report No. 2 (1954) by the Los Angeles Air Pollution Foundation, Haagen-Smit shows that exhaust hydrocarbons in the presence of sunlight and nitrogen dioxide, are converted to oxidation products, which are responsible for the eye-irritating, plant-damaging, and reduced visibility characteristics of smog; that the intermediate product is believed to break down to form ozone, which in turn may further oxidize certain hydrocarbons, principally olefins; and that some of these intermediate products and the ozone itself are believed to comprise the high "oxidant" content of the Los Angeles atmosphere. (Chemistry and Physiology of the Los Angeles Smog, Industrial and Engineering Chemistry 44, pp. 1342–6; 1952 and "Ozone Formation in Photochemical Oxidation of Organic Substances," Industrial and Engineering Chemistry 45, pp. 2086–9; 1953). In a paper, entitled "Relative Reactivity of Various Hydrocarbons in Polluted Atmospheres" by E. R. Stephens and W. E. Scott, presented May 17, 1962 to the American Petroleum Institute's Division of Refining, it is stated that irradiated "dilute mixtures of olefin with nitrogen dioxide in air" produced most of the symptoms of photochemical air pollution with eye irritant products, identified as formaldehyde, acrolein and peroxyacyl nitrates; and with plant damaging products, identified as ozone and peroxyacyl nitrates.

It is generally conceded that the major contaminant of the air in Los Angeles is automobile exhaust. For the efficient performance demanded, an automotive engine is operated under "rich mixture" conditions with insufficient air for complete combustion. Because an internal combustion engine acts as a "cracking" device with regard to the fuel introduced therein, the major portion of the exhaust hydrocarbons is unsaturated or olefinic in character and, as such, is easily reacted upon in the atmosphere to produce smog conditions. In their study of hydrocarbon emission by automobile exhausts to the atmosphere, Magil et al. ("Hydrocarbon Constituents of Automobile Exhaust Gases," Proceedings of the Second National Air Pollution Symposium, Stanford Research Institute, pp. 71–83; 1952) concluded that the exhaust composition is independent of the type of gasoline burned and stated, "The fact that the $C_5$ to $C_7$ olefin concentration in the exhaust is the same for widely different types of gasoline burned emphasizes that the olefinic material in the gasoline does not contribute, except to a very small extent, to the olefinic material in the exhaust." The Air Pollution Field Operations Manual by U.S. Department of Health, 1962, states that ethylene (present in automobile exhaust) causes severe damage to vegetation (page 3) and that the smog-forming potential is also dependent on the ability of specific hydrocarbons to be oxidized (page 32).

It appears that the effort to overcome the problem of emission of noxious gases by internal combustion engines has been mainly confined to treatment of the gases at the muffler or tailpipe of the automobile in the design of chambers in which oxidation of the exhaust gas hydrocarbons might be completed. These adaptations are known as an "afterburner" and a "catalytic converter." Both adaptations demand the introduction of additional air to complete the combustion. With the "afterburner," a pilot light or spark ignites the hydrocarbon-air mixture, and combustion is completed on a hot ceramic surface; while in a catalytic converter, oxidation is completed catalytically at a much lower temperature. The afterburner would seem to present a hazard, due to the necessity of having high temperature and a flame or spark. The catalytic converter has the drawbacks of back pressure and the necessary replacement or regeneration of the catalytic pellet or otherwise arranged solid contact material. This is explained by Thomas E. Corrigan in Chemical Engineering, January 1955, page 199; March 1955, page 197, of which the following excerpts are of note: "When a gas phase chemical reaction is promoted by a solid catalyst, it has to be accompanied by adsorption. The reactants are adsorbed; the products are formed in an adsorbed condition and must be desorbed." . . . "In many reactions there is a continual deposit upon the surface of the catalyst which reduced its effectiveness. Even at a constant flow rate the conversion in a flow reactor may continue to decrease during a run. When the catalyst activity drops to a certain point it is removed and regenerated." . . . "A material which vitiates the value of the catalyst is a poison. A foreign material in the gas stream may either combine permanently with the active centers or merely block the pore opening and hinder diffusion." . . . "A reaction may be self-poisonous; if the adsorption of the product is so great that most of the active centers become occupied by product molecules. There would be no room for further adsorption of reactant molecules and the reaction would cease."

Of more significant concern, is the resultant increase of oxides of nitrogen, created by the mandatory use of secondary air in both the "afterburner" and "oxidation catalytic converter." Report No. 2 (1954) by the Los Angeles Air Pollution Foundation states: "One of the peculiarities of the Los Angeles atmosphere is its high ozone content on smoggy days. Atmospheric ozone measurements elsewhere are seldom higher than 10 pphm and then only after periods of upper air turbulence. On smoggy days in Los Angeles, ozone concentrations (strictly speaking, these are oxidant values, determined iodometrically) range from 30 to 80 pphm and even higher."

As mentioned previously, Haagon-Smit has shown that the oxidant present in the Los Angeles atmosphere may result from the reaction of nitrogen dioxide and certain hydrocarbons in the presence of sunlight. Experimentally, he has duplicated this reaction by reacting 0.4 p.p.m. of nitrogen dioxide with 0.1 to 1.0 p.p.m. of 3-methyl heptane in the presence of sunlight [reference omitted]. A similar action results, using olefins.

Recently haagen-Smit [reference omitted] reported that automobile exhausts irradiated with sunlight in the presence of nitrogen dioxide, both in experienced atmospheric concentrations, forms a rubber-cracking oxidant, presumably ozone.

In his book on "Photochemistry of Air Pollution" (Academic Press 1961), Prof. Phillip A. Leighton stresses the conversion of nitric oxide to nitric dioxide—a rather toxic substance, and states that with the expected adoption of an auto exhaust control device reducing hydrocarbon but not nitric oxide emissions, the question arises whether such adoption may result in an increase in the nitrogen dioxide level to make it a real health hazard.

This invention does not necessitate the use of secondary air and thus, at the outset, lessens the amount of nitrogen oxides that would be formed with the use of an "after burner" or "catalytic converter." It also does not present the problem of having to contend with back-pressure and replacement or regeneration of solid catalysts.

A principal object of the invention is to provide a catalytic composition, which in addition to possessing the capabilities of providing catalytic polymerization and condensation, is freely soluble in the fuel or gasoline and readily vaporized therewith to provide a material decrease in the oxides of nitrogen content and the smog-forming reactivity of the exhaust gases. Such catalyst may be incorporated into the fuel at the refinery, and thus would obviate the disadvantages of installation, inspection and enforcement as required with exhaust devices.

A further object of the invention is to conjunctively treat the engine blowby gases, emitted from crankcase breather pipes, by leading and permitting said gases to intermingle with the catalyst contained in the catalyzed engine exhaust. Mechanical appliances have been installed to draw such blowby gases into the carburetor, so as to be mixed with the fuel to be combusted. In various cases, it has been reported that such combustion tends to lower engine efficiency; also that the blowby gases tend to foul the carburetor. However, the exhaust, resulting from such combustion, may also be treated in accordance with the present invention.

If desired, some of the components arising from the operation of this invention, can also be trapped and recovered. The trap can be so designed as to take the place of the muffler and provided with a material to aid in the coalescing of the vapor. Such materials may be in the form of coatings or loose packs or cartridges of water wettable (lyophillic) materials and hydrocarbon-oil wettable (hydrophobic) materials. Examples of lyophillic materials include fiber glass, ceramics, pumice and silica gel and examples of hydrophobic materials include metallic sulfides, such as iron sulfide, amino or urea resins, and metallic soaps. The incorporation in such a trap of polymerization catalysts such as fluorides of aluminum, cobalt, zinc and calcium or like metallic fluorides and metallic soaps, such as the resinates or stearates of aluminum, copper, calcium and magnesium, would serve the dual function of promoting both coalescence and additional polymerization capability. The lyophillic and hydrophobic materials are preferably intimately mixed, as for example: (1) partial silicon-treated pumice, (2) partial silicon-treated spun glass, (3) a fusion product of pumice, iron sulfide, sodium silicate and borax, (4) incorporation of metallic fluorides and metallic soaps in examples (1) or (2) or (3). Physical aids, including the use of cooling and sonic effects may also be incorporated as a means for promoting coalescence. The by-product trap recovery may be handled in the same manner as crankcase oil drainings, either separately or by addition to the crankcase drainings. The trap must be so constructed as to present a large coated contact surface, as for example a perforated coated helix or a cartridge containing the lyophyllic and hydrophobic materials. Also to provide cooling and sonic effects, the trap may be jacketed with an arranged funnel-shaped inlet for on-rushing air or coolant and a complementary outlet at the rear of the jacket.

Although it is preferable to introduce the catalyst in solution with the fuel or gasoline as aforementioned, the catalyst can also be injected in a liquid state at the carburetor or between the rear of the engine and the muffler, at which interval catalysis takes place in the vapor state, mainly at a temperature between 700° F. and 300° F.

The literature and prior art cite many catalysts for polymerizing and condensing various organic compounds, among which are mentioned unsaturated hydrocarbons, olefins and aldehydes. There is no mention, however, of employing these catalytic principles to inactivate smog-forming components of exhausts from internal combustion engines.

For the most desirable means of application, which is dependent on the catalyst being in solution within the fuel, the composition of the catalytic agent was necessarily so constructed as to enable its effect to take place continuously in the vapor state, without any appreciable precipitation of the catalyst in the fuel tank, carburetor and engine. As a supplementary test, such catalytic agent, in solution in a standard grade of gasoline and also with a premium leaded gasoline, was subjected to sunlight for a period of two months alongside corresponding blanks of gasoline. In both grades of gasoline, the catalytically treated gasoline proved to be clearer with less precipitation than in the untreated gasolines. This preferred type of catalytic composition is herein described for use in materially inactivating the smog-forming constituents of exhausts from internal combustion engines.

As stated in "The Chemistry of Petroleum Derivatives" by Ellis (1934 edition), the introduction of electronegative atoms or groups (such as halogen atoms or phenyl groups) into the olefin hydrocarbon molecule very greatly increases the tendency to polymerization (p. 592). Boron fluoride can be substituted for aluminum chloride in Friedel-Crafts synthesis, as well as in other reactions catalyzed by the latter compound, and can be used to effect condensation of aromatic hydrocarbons with aliphatic chlorides and the addition of hydrogen halides to olefins (p. 596). The conversion of the olefins to high molecular weight oils capable of being utilized as lubricants, by polymerization under the influence of aluminum chloride or boron trifluoride, is an interesting development in the application of the olefins (p. 613). Since boron fluoride is a gas which readily decomposes with moisture and is difficult to handle because of its corrosive and poisonous nature, double compounds can be substituted for it in various reactions. Landolph used the ethereal liquid condensate of ethylene and boron fluoride (ethylene fluoboric acid) with camphor. A double compound of ether and boron fluoride has been employed to condense saturated compounds with olefins (p. 597). Catalysts, such as anhydrous metallic halides and aryldiazonium fluoroborates promote the polymerization of styrene (p. 611).

Various organic complexes of boron trifluoride, (which may also serve as a source of material for practicing this invention), have been made commercially available as listed below:

Boron trifluoride ethyl ether complex
Boron fluoride di-n-butyl-etherate
Boron fluoride ethyl Cellosolve (boron fluoride ethylene glycol monoethyl ether)
Boron trifluoride phenol-polyethylene glycol complex
Boron trifluoride, phenol complex
Boron fluoride p-cresol
Boron fluoride dihydrate
Boron fluoride monohydrate
Boron fluoride di-acetic-acid
Boron fluoride complexes with nitrogenous compounds to include:
    Boron fluoride piperidine
    Boron trifluoride monoethylamine complex
    Boron trifluoride triethanolamine complex
    Boron fluoride urea
    Boron fluoride hexamethylene tetramine.

Also, made available are publications of numerous abstractive references, relative to organic complexes of boron trifluoride. Yet nowhere in these several hundred references or elsewhere is there any mention of their application to inactivating and treating internal combustion engine gases, and particularly as herein set forth.

Of specific significance, as a source of material for performing this new process, is boron trifluoride ethyl ether complex, $BF_3(C_2H_5)_2O$, to which is ascribed the following in the General Chemical Division data sheet:

"Boron Trifluoride Etherate, with approximately 48% Boron Trifluoride content, is a liquid at room temperature, and represents a convenient way of dispensing or using Boron Trifluoride etherate as a catalyst or as a raw material for chemical reactions."

In general, the uses of Boron Trifluoride Etherate are similar to those of Boron Trifluoride gas; however, in some cases it may perform while the gas would not and vice versa. Some uses of the Etherate (from literature, patents and trade reports) are:

(A) For Polymerization (or Copolymerization), including those of:

(1) Olefins and di-olefins.
(2) Styrene or derivatives with various unsaturated compounds.
(3) Heterocyclic organic unsaturates (indene, coumarone, etc.)
(4) Unsaturated acids and esters.
(5) Terpenes and homologs.

(B) In the preparation of:

(1) Esters
(2) Steroids
(3) Synthetic resins.

(C) In reactions such as (1) Alkylations of aromatic hydrocarbons and of phenols with olefins and alcohols.
(2) Cyclizing of natural and synthetic elastomers."

By reacting boron trifluoride ethyl ether complex or like ether complex with certain nitrogenous or amino organic compounds, I have obtained a type of derivative that is soluble in the fuel or gasoline and in liquid aliphatic hydrocarbons, and which is capable of acting as a polymerization and condensation catalyst. This type of compound, designated herein as "Type A," in liquid form, was found useful for directly treating the engine exhaust to decrease its deleterious reactivity, and preferably by injecting the "Type A" compound between the rear of the engine and the muffler. Although "Type A" compound is soluble in gasoline and aliphatic hydrocarbons, it was found that when introduced into solution in the fuel for indirectly treating the exhaust, a perceptible precipitation occurs on carburetion which will eventually foul the carburetor.

For treating the exhaust indirectly, i.e., where the catalyst is used in solution with the fuel, I have employed a type of compound which possesses the properties of being soluble in gasoline and in aliphatic hydrocarbons and has the capability of inhibiting precipitous depositary action in the carburetor or the engine. This composition, herein designated as "Type B," consists of the "Type A" nitrogenous boron fluoride either complex in admixture with an alkyl or aryl compound, bearing an inorganic negative radical. In addition to being capable of maintaining solubility of the end product in the fuel and of inhibiting precipitous deposition, the alkyl or aryl compound, bearing an inorganic negative radical, was found to have the capacity of combining with any of the amine that might be present as such in the "Type A" composition.

The requirement of complete solubility of the end product catalyst in the fuel and in liquid aliphatic hydrocarbons proved to be a primary means for selecting a suitable alkyl or aryl compound, bearing an inorganic negative radical. For example, although diethyl sulfate is an alkyl compound, bearing an inorganic negative radical, the product of the admixture of diethyl sulfate with the "Type A" compound, when added to gasoline, was found to give an unstable turbid solution and therefore was inadequate for making the "Type B" compound.

Both "A" and "B" types, in the methods attributed thereto, provide for continuous introduction of a vapor-forming catalyst in intimate gaseous admixture with the exhaust gas flow from the engine. In addition to being directly added to the fuel, the "Type B" compound can also be used for injection between the rear of the engine and the muffler, and thus may serve as a general catalyst agent for the purpose of this invention.

Although Boron Fluoride Di-n-butyletherate or Boron Fluoride Ethyl "Cellosolve" (Boron Fluoride Ethylene Glycol Monoethyl Ether) or Landolph's ethereal liquid condensate of ethylene and boron fluoride with camphor or a complex of boron fluoride and an ether amine may be used instead of Boron Trifluoride Ethyl Ether Complex in the preparation of the "A" and "B" type compounds, the factors of availability and economy make it more practical to use of Boron Trifluoride Ethyl Ether Complex as the main catalyst source for practicing this invention.

In my investigation of suitable nitrogenous organic compounds for combination with Boron Trifluoride Ethyl Ether Complex or the like, to give a Type A or a Type B product, which is soluble in the gasoline and in liquid aliphatic hydrocarbons, I have found that the water soluble nitrogenous compounds, such as the water soluble amines, were unsuitable, and that only certain types of water-insoluble amines fulfilled such requirement. Suitable amines of this nature were found among the aliphatic and aromatic types, namely the following:

Tertiary-alkyl primary amines ($R_3C-NH_2$), containing at least nine carbon atoms, such as t-Nonylamine and those commercially available under the trade names of "Primene 81–R" to designate a $$t-C_{12}H_{25}NH_2 \text{ to } t-C_{15}H_{31}NH_2$$

composition and "Primene JM–T" to designate a $t-C_{18}H_{37}NH_2$ to $C_{24}H_{49}NH_2$ composition.

Primary alkyl aryl amines, wherein the alkyl radical composition is large enough to render requisite solubility of the end product in gasoline and in liquid aliphatic hydrocarbons, and including Dodecylaniline, which is commercially available as a technical grade, termed "Alkylaniline C–21."

The requirement that the organic nitrogenous derivative of the boron fluoride ether complex give a clear or stable solution in gasoline and in liquid aliphatic hydrocarbons, as demanded in adding the catalyst to the fuel, proved to be a marked differentiating factor for determining the proper organic nitrogenous compounds. This is demonstrated by the large number of nitrogenous organic compounds, which could not meet this test, although on the water-insoluble side. The following organic nitrogenous compounds showed this inadequacy of not being able to render a derivative of the boron fluoride ether complex, which would give a clear or stable solution in gasoline and aliphatic hydrocarbons:

Aniline, diethylaniline, primary t-butyl amines, primary-t-octyl amine, dicyclohexylamine, diamylamine, octylamine, tetradecylamine, decylamine, rosin amine, coco amine, soy amine, octadecylamine, hexadecylamine, 2-methyl-5-ethyl pyridine, ortho toluidine, 2,4-lutidine (dimethyl pyridine), secondary $C_{16}$ to $C_{18}$ fatty amines, N-di-secondary-butyl-p-phenylene diamine and triallylamine.

Triamylamine, dodecylamine and tallow amine derivatives of boron fluoride ether complexes were border line cases, but proved unsuitable because of their inability to stay in solution in the fuel.

Also, the following available boron fluoride nitrogenous compounds could not meet this requirement of solubility and did not give a clear or stable solution in gasoline and aliphatic hydrocarbons:

Boron fluoride piperidine, boron trifluoride monoethylamine complex, boron trifluoride triethanolamine complex, boron fluoride urea, boron fluoride hexamethylene tetramine.

Although it is preferable, if injection is to be made at the rear of the engine, to employ the fuel soluble derivatives, i.e., "Type A" or "Type B" compounds, the requirement of solubility is not so necessary here. The boron trifluoride etherate itself or its reaction products with other amines such as referred herein as unsuitable for making "Type A" or "Type B" compounds, can be added directly to the exhaust gases. The resultant compounds, or the above listed boron fluoride nitrogenous compounds or the other herein listed boron fluoride compounds, could be injected in conjunction with an additive or solvent, when so required.

For making "Type B" compounds, suitable alkyl and aryl compounds bearing an inorganic radical were found to be as follows:

Chlorinated hydrocarbons, e.g., perchloroethylene, trichlorobenzene, 2 ethyl hexyl chloride, chloroform, trichloropropane, methylene chloride, ethylene dichloride, trichloroethylene, butyl chloride, monochlorotoluene, monochlorobenzene and orthodichloro benzol; ethylene chlorhydrin; carbon tetrachloride, dichloroethyl ether; nitro benzol; triphenyl phosphite; triethyl phosphate; benzo-trifluoride, and tricresyl phosphate.

The following examples are given for producing the composition of matter of this invention, herein referred to as "Type A" and "Type B" compounds and designated with the numeral, following the alphabetic letter.

EXAMPLE A–1

Parts by volume
Boron trifluoride di-ethyl ether complex (approximately 48% boron trifluoride content) _____ 100
$t-C_{12}H_{25}NH_2$ to $t-C_{15}H_{31}NH_2$ (Primene 81–R) _____ 200

The reaction vessel is preferably fitted with a reflux condenser and cooling coil. The ether complex is first introduced and cooled to a temperature of approximately 50° F. the "Primene 81–R" is slowly added with stirring and cooling, so that the temperature of the reaction preferably does not exceed 80° F. Ethyl ether is evolved and is retained in the reaction vessel as a diluent component of Example A–1. Stirring is continued for approximately one hour after completion of the amine addition.

EXAMPLE A–2

Parts by volume
Boron trifluoride di-ethyl ether complex _____ 100
$t-C_{18}H_{37}NH_2$ to $t-C_{24}H_{49}NH_2$ (Primene JM–T) _____ 280

Same procedure as in Example A–1. Ethyl ether is evolved and retained as a diluent component.

EXAMPLE A–3

Parts by volume
Boron trifluoride di-ethyl ether complex _____ 100
Tertiary nonylamine _____ 200

Same procedure as in Example A–1. Ethyl ether is evolved and retained as a diluent component.

EXAMPLE A–4

Parts by volume
Boron trifluoride di-ethyl ether complex _____ 100
Dodecylaniline (Alkylaniline C–21) _____ 280

Same procedure as in Example A–1. Ethyl ether is evolved and retained as a diluent component.

EXAMPLE A–5

Parts by volume
Boron fluoride di-N-butyl ether complex (approximately 34% boron trifluoride content) _____ 140
$t-C_{12}H_{25}NH_2$ to $t-C_{15}H_{31}NH_2$ ("Primene 81–R") ___ 200

Same procedure as in Example A–1. Di-N-butyl ether is evolved and retained as a diluent component. The temperature is kept approximately the same as in Example A–1 to prevent excessive fuming, although the boiling point of di-N-butyl ether is much higher than that of ethyl ether.

EXAMPLE A–6

Parts by volume
Boron fluoride di-N-butyl ether complex _____ 140
$t-C_{18}H_{37}NH_2$ to $t-C_{24}H_{49}NH_2$ ("Primene JM–T") ___ 300

Same procedure as in Example A–5. Di-N-butyl ether is evolved and retained as a diluent component.

EXAMPLE A–7

Parts by volume
Boron fluoride di-butyl ether complex _____ 140
Tertiary nonylamine _____ 200

Same procedure as in Example A–5. Di-N-butyl ether is evolved and retained as a diluent component.

EXAMPLE A–8

Parts by volume
Boron fluoride di-N-butyl ether complex _____ 140
Dodecylaniline ("Alkylaniline C–21") _____ 300

Same procedure as in Example A–5. Di-N-butyl ether is evolved and retained as a diluent component.

EXAMPLE A-9

| | Parts by volume |
|---|---|
| Boron fluoride ethylene glycol monoethyl ether complex (termed boron fluoride "Cellosolve" Complex) (approximately 43% boron trifluoride content.) | 112 |
| t-$C_{12}H_{25}NH_2$ to t-$C_{15}H_{31}NH_2$ ("Primene 81-R") | 200 |

Same procedure as in Example A-5. Ethylene glycol monoethyl ether is evolved and retained as a diluent component.

EXAMPLE A-10

| | Parts by volume |
|---|---|
| Boron fluoride ethylene glycol monoethyl ether complex | 112 |
| t-$C_{18}H_{37}NH_2$ to t-$C_{24}H_{49}NH_2$ ("Primene JM-T") | 300 |

Same procedure as in Example A-5. Ethylene glycol monoethyl ether is evolved and retained as a diluent component.

EXAMPLE A-11

| | Parts by volume |
|---|---|
| Boron fluoride ethylene glycol monoethyl ether complex | 112 |
| Tertiary nonyl amine | 200 |

Same procedure as in Example A-5. Ethylene glycol monoethyl ether is evolved and retained as a diluent component.

EXAMPLE A-12

| | Parts by volume |
|---|---|
| Boron fluoride ethylene glycol monoethyl ether complex | 112 |
| Dodecylaniline | 300 |

Same procedure as in Example A-5. Ethylene glycol monoethyl ether is evolved and retained as a diluent component.

EXAMPLE B-1

| | Parts by volume |
|---|---|
| Product of Example A-1 | 140 |
| Perchlorethylene | 60 |

Mixed at ordinary temperatures for a period of about one hour under reflux condenser.

EXAMPLE B-2

| | Parts by volume |
|---|---|
| Product of Example A-1 | 140 |
| Trichlorobenzene | 60 |

Procedure as in Example B-1.

EXAMPLE B-3

| | Parts by volume |
|---|---|
| Product of Example A-1 | 140 |
| Ethylene chlorhydrin | 60 |

Procedure as in Example B-1.

EXAMPLE B-4

| | Parts by volume |
|---|---|
| Product of Example A-1 | 140 |
| Benzotrifluoride | 60 |

Procedure as in Example B-1.

EXAMPLE B-5

| | Parts by volume |
|---|---|
| Product of Example A-1 | 200 |
| Triphenyl phosphite | 60 |

Procedure as in Example B-1.

EXAMPLE B-6

| | Parts by volume |
|---|---|
| Product of Example A-1 | 120 |
| Triethyl phosphate | 80 |

EXAMPLE B-7

| | Parts by volume |
|---|---|
| Product of Example A-1 | 140 |
| 2-ethyl hexyl chloride | 60 |

Procedure as in Example B-1.

Corresponding products to those obtained in Examples B-1 to B-7 inclusive are obtained by substituting in each individual case for the "Product of Example A-1," any of the corresponding end products, shown under Examples A-2 through A-12 respectively.

In making "Type A" compounds by the interaction of a boron fluoride ether complex with a suitable amine, an ether is broken loose from the boron fluoride ether complex and replaced by the amine, which had been reacted with said complex, as illustrated by the following equations:

$$BF_3(C_2H_5)_2O + R_3C\text{-}NH_2 \rightarrow BF_3NH_2C\text{-}R_3 + (C_2H_5)_2O$$

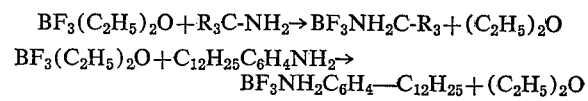

In making the "Type B" compound, wherein the product of "Type A" is admixed with an alkyl or aryl compound, bearing an inorganic radical, any available uncombined amine that might be present of the "Type A" compound is combined with or taken up by a requisite amount of said alkyl or aryl compound to leave the balance of inorganic alkyl or aryl compound as a component of the "Type B" compound.

The proportion of percentage of the additive which may be used with relation to the fuel will depend upon the type of internal combustion engine and the degree of polymerization and condensation capability which is desired. Although the percentage of additive for automobiles would generally come within the range of 0.1% to 1.0% by weight of the fuel the catalyst may be used within the broad range of 0.01% to 5% by weight of the fuel to cover all types of internal combustion engines and degrees of catalytic effect.

One method for determining the increase in molecular structure, to show inactivation of the exhaust, consisted in analyzing the exhausts from various engine runs according to the following procedure:

The engine was first warmed by running the car for a period of 15 minutes and then turned off. Immediately thereafter, a tight fitting attachment was made to the end of the exhaust pipe, consisting of a filterable trap, to which was attached a condenser with ice water as the coolant.

The engine was then started and run at idling speed for 20 minutes. At the end of this interval, the trap was disconnected and the contents thereof washed with water to remove and recover adherent sediment and oily material. These washings were acidified with sulfuric acid and titrated with a 0.1% aqueous solution of potassium permanganate.

The condensate from the cooled condenser was also acidified with sulfuric acid and titrated with 0.1% aqueous potassium permanganate solution.

An average of the various runs gave the following results:

Without addition of catalyst, the washings from the trap alone required an average of 80 cc. of the permanganate solution, while the corresponding condensate required an average of 46 cc.

With addition of catalyst, the washings from the trap alone required an average of 115 cc. of the potassium permanganate solution, while the corresponding condensate required 11 cc.

The increased potassium permanganate consumption of the treated trap washings, relative to the untreated trap washings, demonstrated that an increase in particle size or molecular structure of the unsaturated or olefinic hydrocarbons had taken place to enable trap retention. By taking the aforesaid figures of 115 cc. plus 11 cc. or those of 80 cc. plus 46 cc. as the total of 126 to represent the available unsaturates in the untreated exhaust, the percentage thereof retained in the trap, because of increase in particle size or molecular structure, would be equivalent to $$\frac{115 \times 100}{126}$$

or 91.3%.

It may be noted that approximately 80% of the reducible substances, recovered from the trap alone, as aforestated, is oil soluble or oil extractable. The remainder is somewhat water-soluble or water-miscible.

To further demonstrate inactivation in the exhaust omission, additional tests, with and without the catalytic additive, were made as follows:

To insure adequate distribution, the catalyst was added in the proportion of 0.5%, relative to the fuel.

The automobile was placed on a Clayton dynamometer. Samples were then taken by collecting the automobile exhaust gases produced in a large plastic bag, as the automobile was driven through the seven modes of operation, specified in the California Motor Vehicle Pollution Control Board sampling method, to simulate the inertia of the moving car at rates up to 50 miles per hour, so as to cover cruising, acceleration, deceleration and idling. This produced two integrated samples, with and without the additive, which were then returned to the laboratory for analysis. Separate samples were taken for the oxides of nitrogen determinations.

Total saturated hydrocarbons were determined with a non-dispersive infrared instrument, in accordance with the California Motor Vehicle Pollution Control Board method.

A Perkin-Elmer model 154B gas chromatograph was used to determine the distribution of hydrocarbons from $C_2$ and $C_6$ using a dimethylsufolane column at 30° C.

The carbon dioxide, oxygen, and carbon monoxide concentrations in the exhaust gas were determined by the Orsat gas absorption method.

Oxides of nitrogen were determined by the phenoldisulfonic acid colorimetric method of analysis.

The results are summarized in the following tables:

|  | Without additive | With additive |
| --- | --- | --- |
| Carbon dioxide, percent | 10.9 | 12.0 |
| Carbon monoxide, percent | 1.1 | 1.6 |
| Oxygen, percent | 4.4 | 2.3 |
| Oxides of nitrogen, p.p.m. | 1,820 | 1,290 |
| Nondispersive infrared: saturated hydrocarbons, p.p.m. | 337 | 437 |
| Gas chromatographic analysis: total $C_2$–$C_6$ hydrocarbons, p.p.m. | 380 | 325 |

The total hydrocarbon emission showed the engine to be in excellent running condition and thus makes the differentiating factors predominant.

Road tests, wherein the catalyst was added as 0.1% of the fuel, showed such additive to give better running performance with an average of 20% increase in mileage per gallon of gasoline, as compared to road tests without the additive in the fuel. This result is substantiated by the above analyses for carbon dioxide, carbon monoxide and oxygen as demonstrating better combustion with the catalytic additive.

An interpretation of the above tabulated comparative results disclosed that the additive caused a 45% increase in carbon monoxide and a 29% decrease in oxides of nitrogen. These two factors indicate that the additive produced a change in the specific gravity of the hydrocarbons to effect a fuel-air ratio change. Also, the additive caused a 13% increase of the saturated hydrocarbon, as shown with the nondispersive infrared analyzer, and a 14% reduction of the $C_2$–$C_6$ hydrocarbons, as measured by gas chromatograph. The latter two results disclose that a change in the hydrocarbon type had taken place and support the findings of the aforestated potassium permanganate tests to denote increase in molecular structure of the unsaturated hydrocarbons with the use of the additive.

In the preferred method for practicing this invention with the "Type B" compound as an additive to an aliphatic hydrocarbon motor fuel, complete solubility of the additive therein to provide a stable solution constitutes the primary requirement for the motor fuel to function properly. I have found that boron trifluoride etherates or the other fluoride compounds herein shown, other than the "Type A" and "Type B" compounds, in solution with a solvent, will separate when the solvent solution is added to gasoline or aliphatic hydrocarbons.

$BF_3(C_2H_5)_2O$ is soluble in isopropyl alcohol and gasoline is also soluble in isopropyl alcohol. Isopropyl alcohol can, therefore, be termed "a gasoline-soluble solvent." However, when the isopropyl alcohol solution of boron trifluoride etherate is mixed with the isopropyl alcohol solution of gasoline, the boron trifluoride etherate separates from the resultant mixture. It would, therefore, be impractical to add a mixture of gasoline with an isopropyl alcohol solution of boron trifluoride etherate to a storage tank. This was demonstrated by comparison tests in which isopropyl alcohol solutions of $BF_3(C_2H_5)_2O$ were added to gasoline and a "Type B" compound was added in gasoline at the same concentrations. The "Type B" compound used for this comparison is that shown in "Example B-5" as the derivative obtained from the admixture of Triphenylphosphite with the reaction product of $BF_3(C_2H_5)_2O$ and the $t\text{-}C_{12}H_{25}NH_2$ to $t\text{-}C_{15}H_{31}NH_2$ commercial tertiary primary amine reagent.

Both 5% and 50% by weight solutions of $MF_3(C_2H_5)_2O$ in isopropyl alcohol gave clear stable solutions. Similarly, 5% and 50% by weight solutions of the "Type B" compound in gasoline as the solvent gave clear stable solutions.

When the 5% by weight boron trifluoride etherate-isopropyl alcohol solution was added to gasoline in an amount of 0.02% by weight of the gasoline, which is equivalent to 0.00001% by weight of $BF_3(C_2H_5)_2O$, a turbid dispersion results which on immediate shaking causes an adherent deposit to form on the side of the bottle. After 24 hours, a film is also deposited on the sides of the bottle. Shaking with additional gasoline does not remove or solubilize the deposit or the film.

When the 5% by weight boron trifluoride etherate-isopropyl alcohol solution is added to gasoline in an amount of 2.5% by weight, which is equivalent to 0.00125% by weight of $BF_3(C_2H_5)_2O$, a heavier turbid dispersion is formed and immediate shaking causes a heavier adherent deposit to form on the bottom of the bottle. On standing for 2 hours, the dispersed $$BF_3(C_2H_5)_2O$$

settles out and after 24 hours, a film is deposited on sides of the bottle in addition to the residue and precipitated etherate. Shaking with additional gasoline does not remove or solubilize the film or the adherent residue or the precipitated etherate.

When the 5% by weight $BF_3(C_2H_5)_2O$-isopropyl alcohol solution is added to gasoline in an amount of 50% by weight, which is equivalent to 0.0025% by weight of $BF_3(C_2H_5)_2O$, a heavy turbid dispersion is formed and the dispersed etherate settles out within 2 hours. After 24 hours, a film is deposited on the sides of the bottle and in addition to the precipitated etherate, an adherent residue appears on the bottom of the bottle. Shaking with additional gasoline does not remove or solubilize the film, the residue or the precipitated etherate.

When the 50% by weight boron trifluoride etherate-isopropyl alcohol solution is added to gasoline in the proportion of 0.02% by weight, which is equivalent to 0.0001% by weight of $BF_3(C_2H_5)_2O$, a turbid dispersion is formed and some settling takes place. The $$BF_3(C_2H_5)_2O$$

settles out within one hour and after 24 hours, a film is deposited on the sides of the bottle and an adherent residue appears with the precipitated etherate on the bottom of the bottle. Shaking with additional gasoline does not remove or solubilize the film, the residue or said etherate.

When the 50% by weight boron trifluoride etherate-isopropyl alcohol solution is added to gasoline in an amount of 2.5% by weight, which is equivalent to 0.0125% by weight of $BF_3(C_2H_5)_2O$, the $BF_3(C_2H_5)_2O$ settles to the bottom and after being shaken, a turbid dispersion of the etherate takes place and then immediately settles out. After 24 hours, a film is deposited on the sides of the bottle and an adherent residue appears with the settled etherate on the bottom of the bottle. Shaking with additional gasoline does not remove or solubilize the film, the residue or said etherate.

When the 50% by weight boron trifluoride etherate-isopropyl alcohol solution is added to gasoline in an amount of 5% by weight, which is equivalent to 0.025% by weight of $BF_3(C_2H_5)_2O$, the $BF(C_2H_5)_2O$ immediately settles to the bottom and after being shaken, the etherate again settles out immediately. There was no turbidity or adherent residue and after 24 hours, the etherate still remained separated with no turbidity or adherent residue. Shaking with additional gasoline causes residual deposits on the sides and bottom of the bottle and does not remove or solubilize the etherate.

In comparsion, tests using a 5% by weight solution and a 50% by weight solution of the "Type H" compound in gasoline alone as the solvent, additions of the solutions were made to gasoline in the same concentrations employed in the above tests, i.e., 0.02, 2.5, and 50% of the 5% and the 50% solutions in the gasoline. In all of these tests, the "Type B" compound formed a clear stable solution in the gasoline and there was no film formation, no settling of the 'Type B" compound and no residual deposit was formed.

In a blank test using gasoline alone, there was no film, no settling and no residual deposit.

In blank tests using isopropyl alcohol in gasoline in the same concentrations employed in the above tests there was no film, no settling and no residual deposit.

Having fully defined my invention in the foregoing specification, I desire to be limited only by the lawful scope of the following claims, as interpreted according to the spirit and purpose of my invention.

I claim:

1. The product produced by reacting a boron trifluoride etherate selected from the group consisting of a boron trifluoride-diethyl ether complex, a boron trifluoride-di-N-butyl ether complex, a boron trifluoride-ethylene glycol monoethyl ether complex or an ethereal liquid condensate of ethylene and boron trifluoride with comphor with a tertiary alkyl primary amine containing from 9 to 24 carbon atoms or dodecyl aniline, the ether group being displaced from said etherate in the formation of said product.

2. The composition of claim 1 wherein said primary amine is tertiary nonyl amine.

3. The composition of claim 1 wherein said primary amine is a mixture of $t-C_{12}H_{25}NH_2$ to $t-C_{15}H_{31}NH_2$ amines.

4. The composition of claim 1 wherein said primary amine is a mixture of $t-C_{18}H_{37}NH_2$ to $t-C_{24}H_{49}NH_2$ amines.

References Cited

UNITED STATES PATENTS

| | | | |
|---|---|---|---|
| 2,751,285 | 6/1956 | Bartleson | 44—76 |
| 3,037,985 | 6/1962 | Lang et al. | 44—72 X |

CHARLES B. PARKER, Primary Examiner

R. L. RAYMOND, Assistant Examiner

U.S. Cl. X.R.

44—72, 76; 252—182; 260—579